United States Patent
Kuo et al.

(10) Patent No.: US 8,419,193 B2
(45) Date of Patent: Apr. 16, 2013

(54) PROJECTION APPARATUS

(75) Inventors: Chia-Chun Kuo, Tainan County (TW); Chia-Cheng Lai, Tainan County (TW); Chih-Hung Yang, Tainan County (TW); Ming-Cheng Chiu, Tainan County (KR)

(73) Assignee: Himax Display, Inc., Tainan (TW)

( * ) Notice: Subject to any disclaimer, the term of this patent is extended or adjusted under 35 U.S.C. 154(b) by 287 days.

(21) Appl. No.: 12/879,294

(22) Filed: Sep. 10, 2010

(65) Prior Publication Data

US 2012/0062849 A1    Mar. 15, 2012

(51) Int. Cl.
*G03B 21/20* (2006.01)

(52) U.S. Cl.
USPC .......... 353/85; 353/30; 353/31; 353/52; 353/70; 353/101; 348/745; 362/466

(58) Field of Classification Search .......... 353/30, 353/31, 52, 69, 70, 85, 101, 121, 122; 315/370, 315/371, 364, 368.11, 368.12, 368.13, 367, 315/399, 411; 349/5, 7, 8, 9, 61, 62; 250/204, 250/559.11; 165/253, 287, 288
See application file for complete search history.

(56) References Cited

U.S. PATENT DOCUMENTS

| | | | |
|---|---|---|---|
| 6,208,092 B1 * | 3/2001 | Kim | 315/370 |
| 6,886,946 B2 * | 5/2005 | Eguchi | 353/101 |
| 7,079,157 B2 * | 7/2006 | Deering | 345/613 |
| 7,131,731 B2 * | 11/2006 | Oketani | 353/57 |
| 7,222,973 B2 * | 5/2007 | Eguchi | 353/85 |
| 7,364,306 B2 * | 4/2008 | Margulis | 353/31 |
| 2004/0165068 A1 * | 8/2004 | Jane | 348/189 |
| 2006/0203204 A1 * | 9/2006 | Yu | 353/52 |
| 2009/0033879 A1 * | 2/2009 | Saito | 353/52 |

* cited by examiner

*Primary Examiner* — Georgia Y Epps
*Assistant Examiner* — Sultan Chowdhury
(74) *Attorney, Agent, or Firm* — J.C. Patents

(57) ABSTRACT

A projection apparatus including an illumination unit, a brightness detection circuit, a signal conversion circuit, and a control unit is provided. The illumination unit generates a light source according to a plurality of driving signals and provides a temperature sensing signal according to the temperature of the light source. The brightness detection circuit generates a plurality of brightness sensing signals. The signal conversion circuit converts the temperature sensing signal and the brightness sensing signals into temperature information and a plurality of brightness information. The control unit comprises a setting table for storing a predetermined temperature information and a plurality of predetermined brightness information, and the control unit adjusts the driving signals in order to identify the converted temperature information and the converted brightness information conform to the stored information in the setting table.

9 Claims, 14 Drawing Sheets

PROJECTION APPARATUS

BACKGROUND OF THE INVENTION

1. Field of the Invention

The present invention generally relates to a projection apparatus, and more particularly, to a projection apparatus with light source calibration.

2. Description of Related Art

A projection apparatus is a lightweight and small portable projector, and which can be categorized as a micro projector or a pocket projector. A pocket projector is similar to a conventional projector but has a smaller size and a lighter weight therefore can be carried around conveniently. A micro projector is even lighter and smaller therefore can be integrated into a mobile device, such as a cell phone or a digital camera.

The micro projection techniques currently adopted by micro projectors include a liquid crystal display (LCD) technique, a digital light processing (DLP) technique, a liquid crystal on silicon (LCoS) technique, and a micro electro mechanical systems (MEMs) micro scanner technique.

The light source of a projection apparatus may be a RGB light emitting diode (LED), a white-light LED, or a laser light source. In existing micro projection systems, a color sequential technique is broadly adopted to improve the color rendition, and LEDs in red, green, and blue colors are usually used as the light sources to provide rich colors. However, the variability is increased by using LEDs in three different colors instead of a single color, and deviation in white balance may be caused when the wavelength and brightness of the LEDs change with the temperature.

SUMMARY OF THE INVENTION

Accordingly, the present invention is directed to a projection apparatus, wherein in a calibration mode, a setting table is established according to the external control information, and in a feedback control mode, a light source is calibrated according to the setting table to keep the white balance of the light source.

The present invention provides a projection apparatus including an illumination unit, a brightness detection circuit, a signal conversion circuit, and a control unit. The illumination unit generates a light source according to a plurality of driving signals and provides a temperature sensing signal according to the temperature of the light source. The brightness detection circuit detects the brightness of the light source and generates a plurality of brightness sensing signals. The signal conversion circuit converts the temperature sensing signal and the brightness sensing signals into temperature information and a plurality of brightness information. The control unit comprises a setting table for storing a predetermined temperature information and a plurality of predetermined brightness information, and the control unit adjusts the driving signals in order to identify the converted temperature information and the converted brightness information conform to the stored information in the setting table.

According to an embodiment of the present invention, the control unit includes a light source driver and a microcontroller. The light source driver adjusts the driving signals according to driving information to adjust the light source into the white balance mode. In the calibration mode, the microcontroller generates the driving information according to the external control information and records the temperature information and the plurality of brightness information conforming to the white balance mode into the setting table. In the feedback control mode, the microcontroller searches the setting table according to the temperature information and generates the driving information according to the search result.

According to an embodiment of the present invention, the illumination unit includes a light emitting diode (LED) array and a temperature sensor. The LED array provides a first color light, a second color light, and a third color light to compose the light source. The temperature sensor senses the temperatures of the first color light, the second color light, and the third color light to generate the temperature sensing signal.

According to an embodiment of the present invention, the brightness detection circuit includes a plurality of color sensors, a current-to-voltage converter, and an integrator. In a first integration mode, the color sensors are simultaneously turned on to detect the first color light, the second color light, and the third color light according to the sequence in which they are generated. In a second integration mode, the color sensors are sequentially turned on for a predetermined time to respectively detect the first color light, the second color light, and the third color light. The color sensors generate a plurality of sensing currents according to foregoing detection result. The current-to-voltage converter converts the sensing currents into a plurality of sensing voltages. The integrator integrates the sensing voltages according to the first integration mode or the second integration mode to generate the brightness sensing signals.

As described above, in the present invention, a setting table is established in a calibration mode before a projection apparatus leaves the factory. When the projection apparatus is in operation, the control unit calibrates the light source according to white balance parameters recorded in the setting table in a feedback control mode. Thereby, the white balance of the light source is kept and accordingly the image display quality of the projection apparatus is improved.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
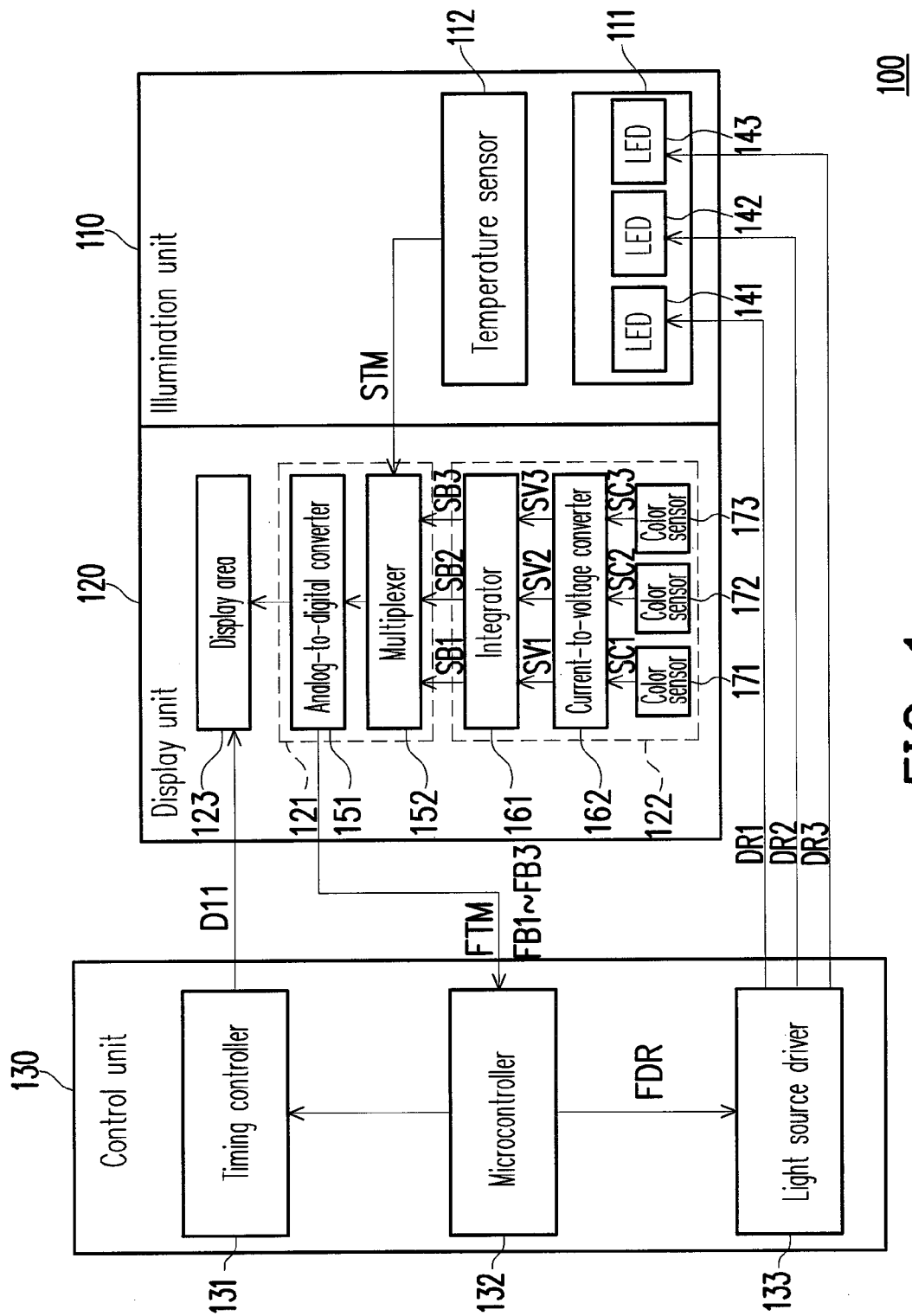
FIG. 1 is a schematic block diagram of a projection apparatus according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a schematic block diagram of a projection apparatus according to an embodiment of the present invention. Referring to FIG. 1, the projection apparatus 100 includes an illumination unit 110, a display unit 120, and a control unit 130. The illumination unit 110 generates a light source. The control unit 130 generates an image data D11. The display unit 120 generates an image according to the image data D11 under irradiation of the light source.

To be specific, the illumination unit 110 includes a light emitting diode (LED) array 111 and a temperature sensor 112. The LED array 111 is composed of a plurality of LEDs. In an exemplary embodiment, the LED array 111 includes a plurality of LEDs 141-143. The LED 141 provides a first color light (for example, a red light), the LED 142 provides a second color light (for example, a green light), and the LED 143 provides a third color light (for example, a blue light). The LED array 111 composes the light source of the projection apparatus 100 by using the first, the second, and the third color light. On the other hand, the temperature sensor 112 senses the temperatures of the first, the second, and the third color light and generates a temperature sensing signal STM accordingly.

The display unit 120 includes a signal conversion circuit 121, a brightness detection circuit 122 and a display area 123. The signal conversion circuit 121 includes an analog-to-digital converter (ADC) 151 and a multiplexer 152. The brightness detection circuit 122 includes an integrator 161, a current-to-voltage converter 162, and a plurality of color sensors 171-173. The display area 123 displays the image according to the image data D11. The color sensor 171 senses the first color light emitted by the LED 141 and generates a sensing current SC1 accordingly. Similarly, the color sensor 172 senses the second color light emitted by the LED 142 and generates a sensing current SC2 accordingly, and the color sensor 173 senses the third color light emitted by the LED 143 and generates a sensing current SC3 accordingly. Furthermore, those having ordinary knowledge in the art should be able to replace the color sensors 171-173 with a plurality of photo sensors according to the spirit of the present embodiment.

The current-to-voltage converter 162 converts the sensing currents SC1-SC3 into sensing voltages SV1-SV3. The integrator 161 integrates the sensing voltages SV1-SV3 to generate brightness sensing signals SB1-SB3. On the other hand, the multiplexer 152 of the signal conversion circuit 121 receives the temperature sensing signal STM and the brightness sensing signals SB1-SB3 and sequentially outputs the temperature sensing signal STM and the brightness sensing signals SB1-SB3. The ADC 151 sequentially converts the signals output by the multiplexer 152 into digital information to generate corresponding temperature information FTM and brightness information FB1-FB3.

It should be noted that the color sensors 171-173 are turned on differently in different modes so that the integrator 161 can perform either short-term integration or long-term integration. Accordingly, the currents or duty cycles of the LEDs 141-143 (i.e., the amplitudes or duty cycles of the driving signals DR1-DR3) can be determined according to the brightness information FB1-FB3 with respect to different integration patterns.

Figure 2:
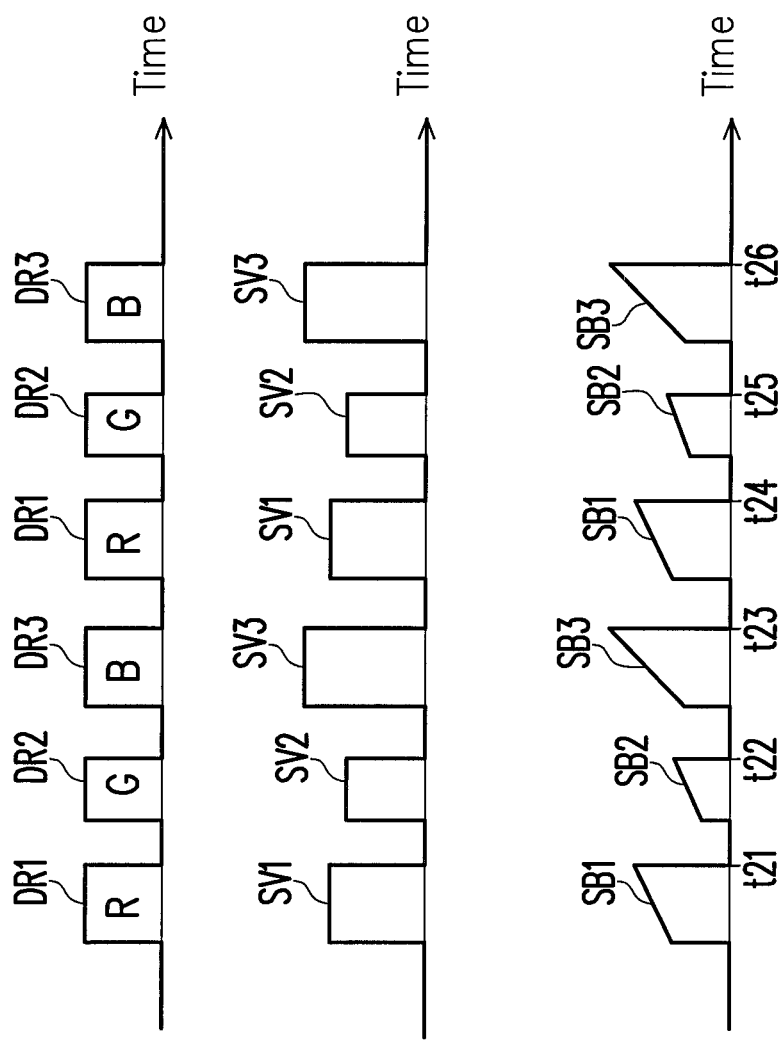
FIG. 2 is a timing diagram illustrating how a brightness detection circuit performs a short-term integration.

FIG. 2 is a timing diagram illustrating how a brightness detection circuit performs a short-term integration. Referring to FIG. 2, the driving signals DR1-DR3 are respectively used for driving the LEDs 141-143. Thus, the LEDs 141-143 are sequentially turned on to sequentially generate the first color light (for example, the red light R), the second color light (for example, the green light G), and the third color light (for example, the blue light B). It should be noted that when the brightness detection circuit performs the short-term integration (i.e., is in a first integration mode), the color sensors 171-173 are simultaneously turned on. Thus, when the first color light (for example, the red light R) is generated, the color sensor 171 generates the corresponding sensing current SC1. Then, when the second color light (for example, the green light G) is generated, the color sensor 172 generates the corresponding sensing current SC2, and when the third color light (for example, the blue light B) is generated, the color sensor 173 generates the corresponding sensing current SC3.

In other words, the current-to-voltage converter 162 sequentially generates the sensing voltages SV1-SV3 along with the sequential generation of the first, the second, and the third color light. The integrator 161 sequentially generates the brightness sensing signals SB1-SB3 and transmits the brightness sensing signals SB1-SB3 to the ADC 151 through the multiplexer 152. The ADC 151 respectively samples the brightness sensing signals SB1-SB3 at time points t21-t26 to generate the brightness information FB1-FB3. It should be mentioned that the variations in the values of the brightness information FB1-FB3 reflect the variations in the amplitudes of the driving signals DR1-DR3 (i.e., the variations in the currents of the LEDs 141-143).

Figure 3A:
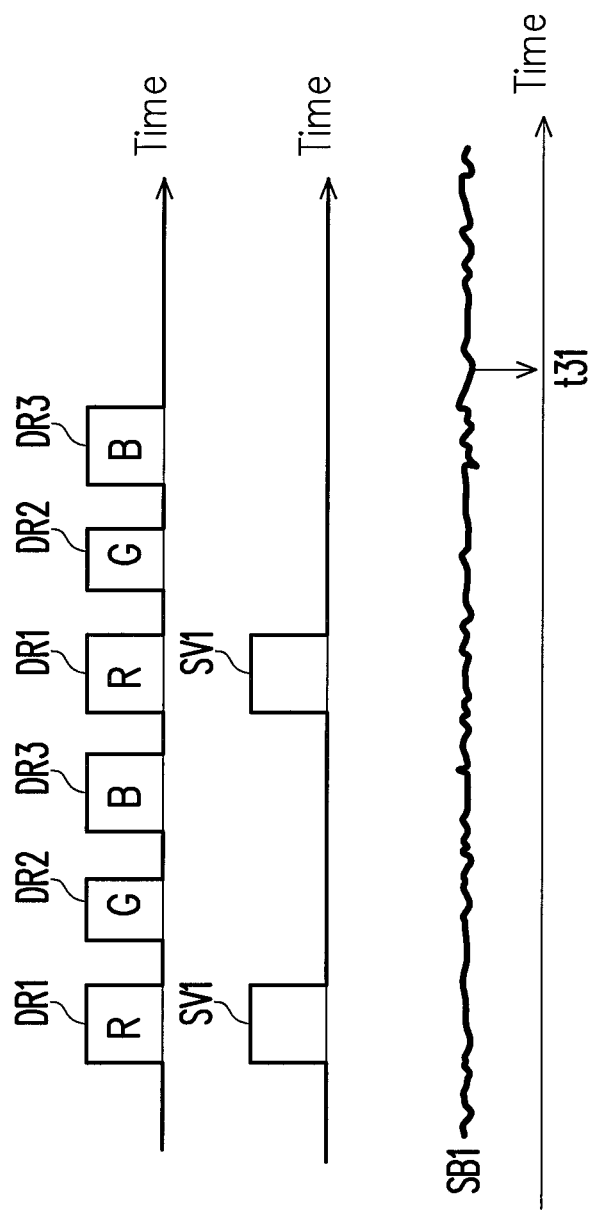
FIGS. 3A-3C are timing diagrams respectively illustrating how a brightness detection circuit performs a long-term integration.
Figure 3B:
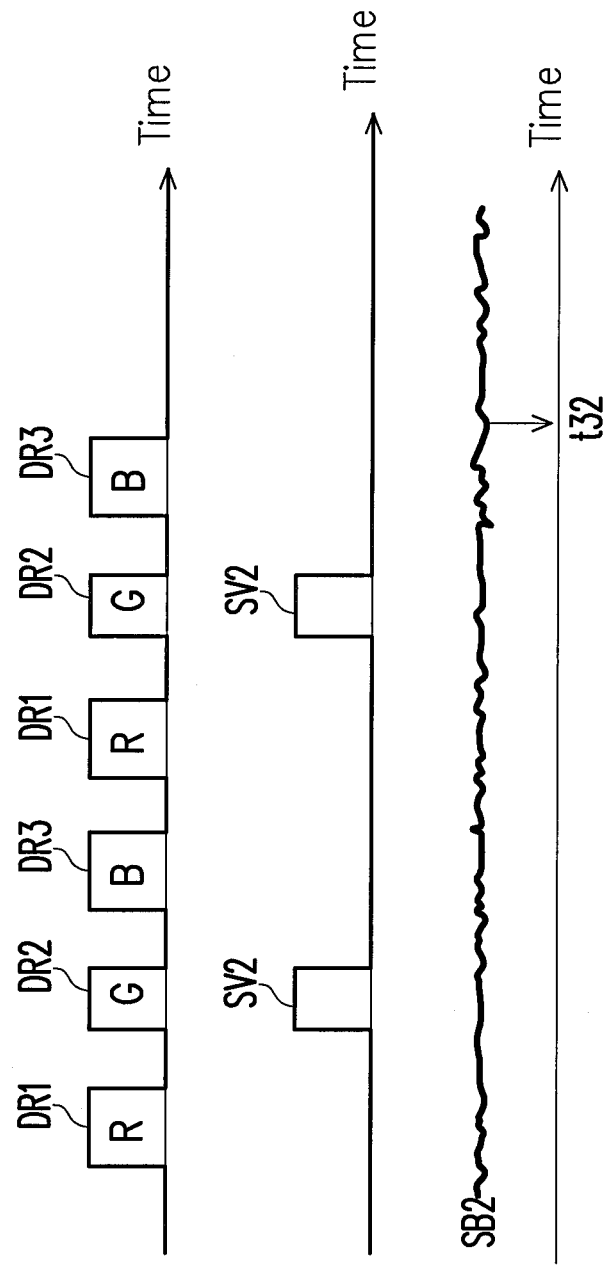
Figure 3C:
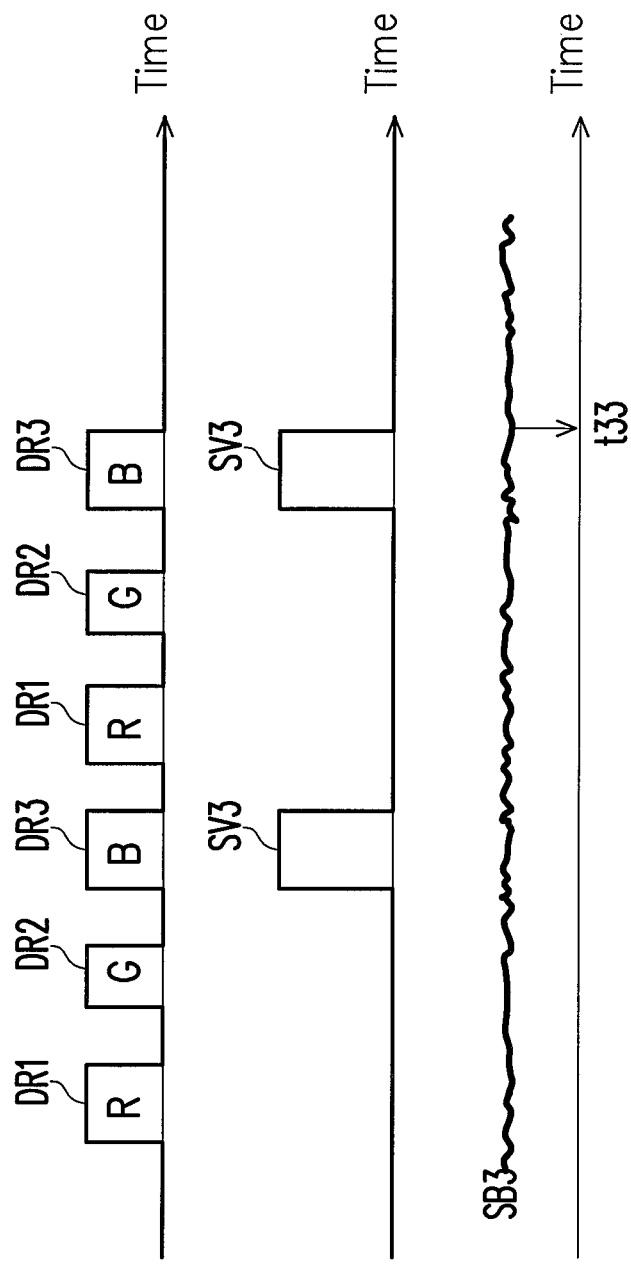

FIGS. 3A-3C are timing diagrams respectively illustrating how a brightness detection circuit performs a long-term integration. It should be noted that when the brightness detection circuit performs the long-term integration (i.e., is in a second integration mode), the color sensors 171-173 are sequentially turned on for a predetermined time. Thus, when the color sensor 171 is turned on, the color sensors 172 and 173 are turned off. Herein, as shown in FIG. 3A, only the first color light (for example, the red light R) is converted into the corresponding sensing current SC1 by the color sensor 171 along with the sequential generation of the first, the second, and the third color light. Within the predetermined time during which the color sensor 171 is turned on, the current-to-voltage converter 162 constantly generates the sensing voltage SV1 so that the integrator 161 performs a long-term integration on the sensing voltage SV1 and accordingly generates the brightness sensing signal SB1 as shown in FIG. 3A. In addition, the ADC 151 samples the brightness sensing signal SB1 at the time point t31 to generate the brightness information FB1.

When the color sensor 172 is turned on, the color sensors 171 and 173 are turned off. Herein, as shown in FIG. 3B, only the second color light (for example, the green light G) is converted into the corresponding sensing current SC2 by the color sensor 172 along with the sequential generation of the first, the second, and the third color light. Within the predetermined time during which the color sensor 172 is turned on, the current-to-voltage converter 162 constantly generates the sensing voltage SV2 so that the integrator 161 performs a long-term integration on the sensing voltage SV2 and accordingly generates the brightness sensing signal SB2 as shown in FIG. 3B. In addition, the ADC 151 samples the brightness sensing signal SB2 at the time point t32 to generate the brightness information FB2.

When the color sensor 173 is turned on, the color sensors 171 and 172 are turned off. Herein, as shown in FIG. 3C, only the third color light (for example, the blue light B) is converted into the corresponding sensing current SC3 by the color sensor 173 along with the sequential generation of the first, the second, and the third color light. Within the predetermined time during which the color sensor 173 is turned on, the current-to-voltage converter 162 constantly generates the sensing voltage SV3 so that the integrator 161 performs a long-term integration on the sensing voltages SV3 and accordingly generates the brightness sensing signal SB3 as shown in FIG. 3C. In addition, the ADC 151 samples the brightness sensing signal SB3 at the time point t33 to generate the brightness information FB3.

In other words, in the first integration mode, the color sensors 171-173 are simultaneously turned on to detect the first, the second, and the third color light according to the sequence in which they are generated. While in the second integration mode, the color sensors 171-173 are sequentially turned on for a predetermined time to respectively detect the first, the second, and the third color light. In addition, the integrator 161 can perform either short-term integration or long-term integration according to different turn-on pattern of the color sensors 171-173. In the first integration mode, the integrator 161 performs a short-term integration such that the variations in the values of the brightness information FB1-FB3 can reflect the variations in the amplitudes of the driving signals DR1-DR3 (i.e., the variations in the currents of the LEDs 141-143). In the second integration mode, the integrator 161 performs a long-term integration such that the variations in the values of the brightness information FB1-FB3 can reflect the variations in the amplitudes or the duty cycles of the driving signals DR1-DR3 (i.e., the variations in the currents or the duty cycles of the LEDs 141-143).

Referring to FIG. 1 again, the temperature information FTM and the brightness information FB1-FB3 generated by the signal conversion circuit 121 is all transmitted to the control unit 130. The control unit 130 includes a timing controller 131, a microcontroller 132, and a light source driver 133. The timing controller 131 generates the image data D11 under the control of the microcontroller 132. The microcontroller 132 generates a driving information FDR, and the light source driver 133 adjusts the driving signals DR1-DR3 according to the driving information FDR. It should be noted that the microcontroller 132 generates the driving information FDR according to different information in different modes so that the light source generated by the illumination unit 110 can be kept in a white balance mode.

Figure 4:
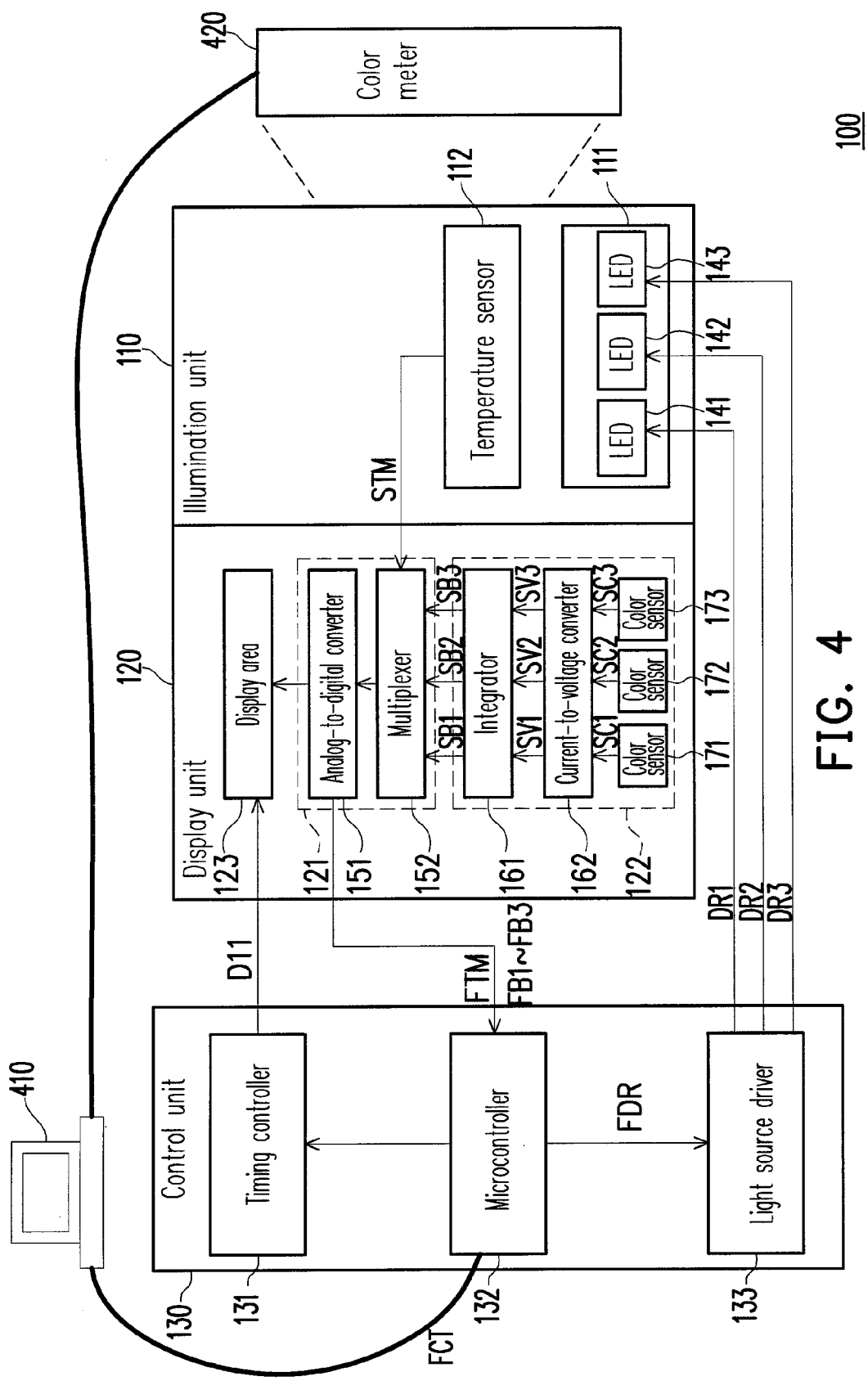
FIG. 4 is a schematic block diagram of a projection apparatus and an external control circuit according to an embodiment of the present invention.

FIG. 4 is a schematic block diagram of a projection apparatus and an external control circuit according to an embodiment of the present invention. As shown in FIG. 4, testing personnel calibrates the white balance of the light source by using a host 410 and a color meter 420 before the projection apparatus 100 leaves the factory. Herein the microcontroller 132 switches into a calibration mode. In the calibration mode, the host 410 transmits external control information FCT to the microcontroller 132. The microcontroller 132 generates the driving information FDR according to the external control information FCT to allow the light source driver 133 to generate the corresponding driving signals DR1-DR3. The driving signals DR1-DR3 drive the illumination unit 110 to generate the corresponding light source. At this time, the testing personnel can determine whether the light source is in the white balance mode based on the information sent back by the color meter 420. If the light source is not adjusted into the white balance mode, the testing personnel sends the external control information FCT again through the host 410 until the light source is in the white balance mode.

It should be noted that the signal conversion circuit 121 generates the corresponding temperature information FTM and brightness information FB1-FB3 every time when the light source is adjusted. Besides, when the light source is adjusted into the white balance mode, the microcontroller 132 further records the temperature information FTM and the brightness information FB1-FB3 conforming to the white balance mode into a setting table, so as to set up a predetermined temperature information FTM' and a plurality of predetermined brightness information FB1'-FB3' in the setting table. Because the light source generated by the LED array 111 changes with the temperature, the testing personnel needs to measure white balance parameters under different temperatures. Accordingly, the setting table established in the microcontroller 132 stores the predetermined temperature information FTM' and the predetermined brightness information FB1'-FB3' corresponding to different temperatures.

On the other hand, the microcontroller 132 switches to a feedback control mode when the projection apparatus 100 is in operation. In the feedback control mode, the microcontroller 132 looks up the setting table according to the temperature information FTM received from the signal conversion circuit 121 to obtain the corresponding predetermined brightness information FB1'-FB3' from the setting table. Besides, the microcontroller 132 compares the obtained predetermined brightness information FB1'-FB3' with the brightness information FB1-FB3 received from the signal conversion circuit 121. If the comparison fails, the microcontroller 132 changes the driving information FDR to calibrate the light source of the illumination unit 110 through the adjustment of the driving signals DR1-DR3. Contrarily, the light source generated by the illumination unit 110 is kept in the white balance mode if the comparison between the predetermined brightness information FB1'-FB3' and the brightness information FB1-FB3 succeeds.

It should be noted that to calibrate the white balance of the light source, the control unit 130 can adjust the driving signals DR1-DR3 through different methods. For example, the light source driver 133 can calibrate the light source generated by the illumination unit 110 by keeping the driving signal DR1 unchanged while adjusting the driving signals DR2 and DR3. In this case, when the white balance of the projection apparatus 100 is adjusted before the projection apparatus 100 leaves the factory, the control unit 130 adjusts the amplitudes and/or the duty cycles of the driving signals DR2 and DR3 according to the external control information FCT, so as to calibrate the light source.

Figure 5A:
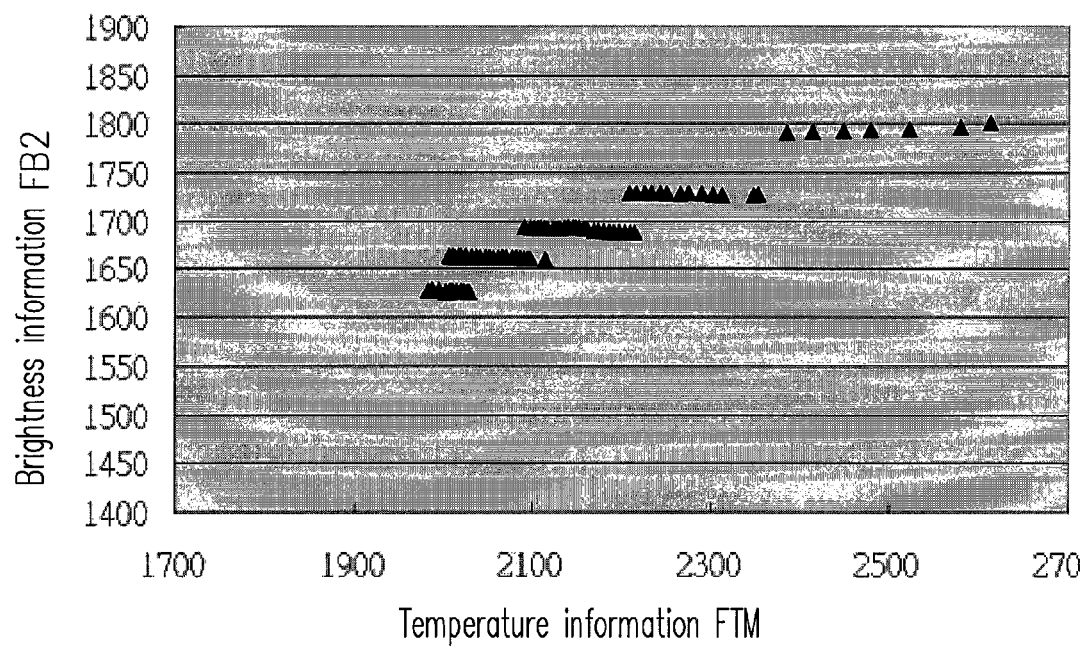
FIGS. 5A-5B are graphs illustrating brightness information vs. temperature information according to an embodiment of the present invention.
Figure 5B:
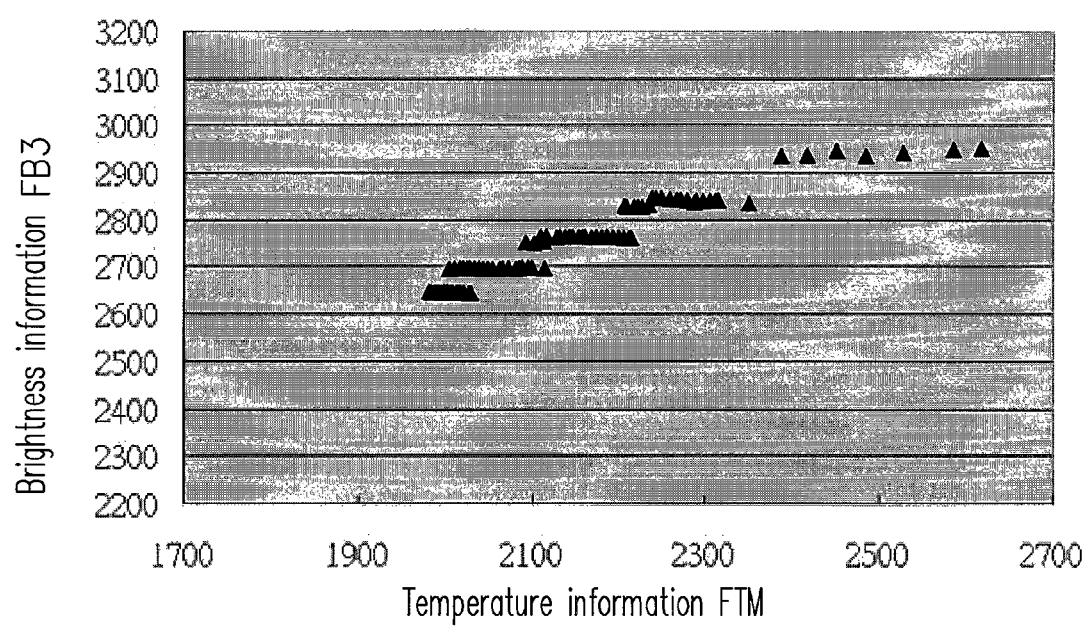

The white balance parameters obtained by the control unit 130 under different temperatures are as shown in FIG. 5A and FIG. 5B. A higher value of the temperature information FTM indicates a lower temperature around the device. Besides, with the driving signal DR1 being kept unchanged, the control unit 130 has to increase the values of the brightness information FB2 and FB3 along with the decrease in the temperature. The predetermined brightness information FB1'-FB3' stored in the setting table is as shown in following table 1, wherein the predetermined brightness information FB1' does not change with the temperature therefore is indicated with "*", and the correspondence between the predetermined brightness information FB2' and FB3' and the predetermined temperature information FTM' is deduced from the information illustrated in FIG. 5A and FIG. 5B.

TABLE 1

|  | FB1' | FB2' | FB3' |
|---|---|---|---|
| 30° C. | * | 1600 | 2090 |
| 40° C. | * | 1600 | 2050 |
| 50° C. | * | 1550 | 2000 |
| 60° C. | * | 1500 | 1900 |
| 70° C. | * | 1400 | 1800 |

Figure 6A:
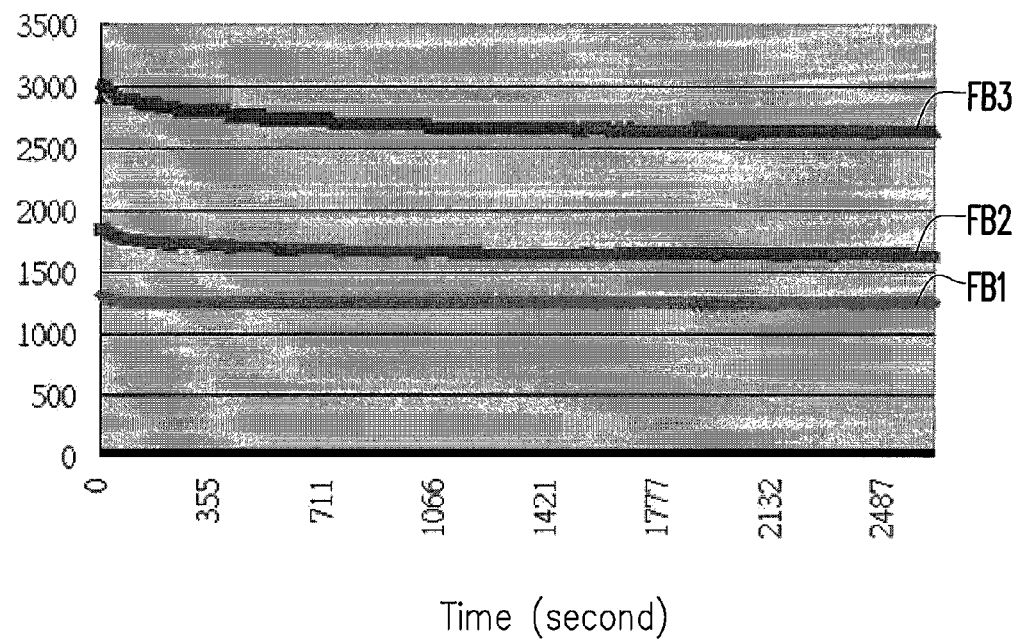
FIGS. 6A-6B are graphs respectively illustrating brightness information and light emitting diode (LED) currents vs. time according to an embodiment of the present invention.
Figure 6B:
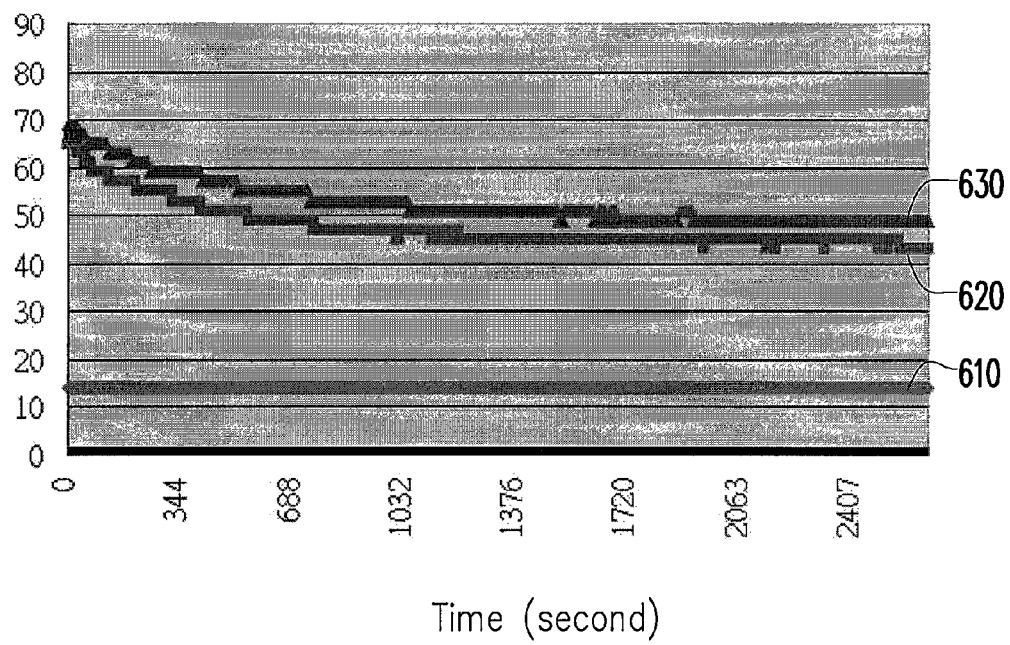

Besides, when the projection apparatus 100 is in operation, the microcontroller 132 also keeps the driving signal DR1 unchanged and adjusts the amplitudes and/or the duty cycles of the driving signals DR2 and DR3 according to foregoing table 1, so as to keep the light source in the white balance mode. Herein, as shown in FIG. 6A, while adjusting the light source, the brightness information FB1 is kept unchanged, and the brightness information FB2 and FB3 approaches the predetermined brightness information FB2' and FB3' stored in the setting table along with the elapse of time. FIG. 6B is a timing diagram of the currents flowing through the LEDs in FIG. 6A, wherein the curves 610-630 respectively indicate the currents flowing through the LEDs 141-143. As shown in FIG. 6B, while adjusting the light source, the current flowing through the LED 141 remains unchanged, while the currents flowing through the LEDs 142 and 143 approaches a predetermined value along with the elapse of time.

On the other hand, the light source driver 133 may also calibrate the light source generated by the illumination unit 110 by keeping the driving signal DR2 unchanged while adjusting the driving signals DR1 and DR3. Accordingly, when the white balance of the projection apparatus 100 is calibrated before the projection apparatus 100 leaves the factory, the control unit 130 adjusts the amplitudes and/or the duty cycles of the driving signals DR1 and DR3 according to the external control information FCT, so as to calibrate the light source.

Figure 7A:
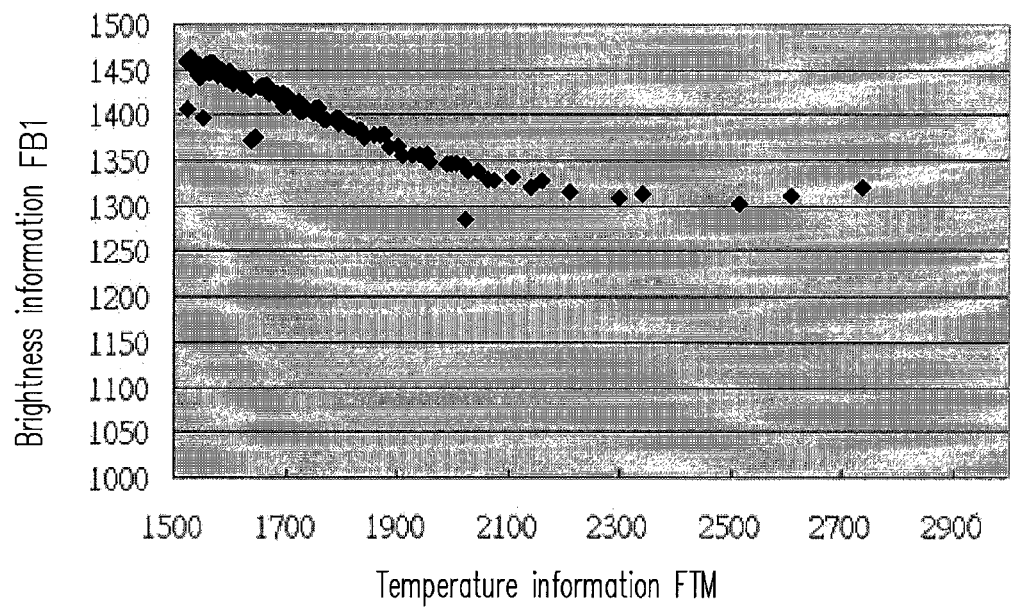
FIGS. 7A-7B are graphs illustrating brightness information vs. temperature information according to another embodiment of the present invention.
Figure 7B:
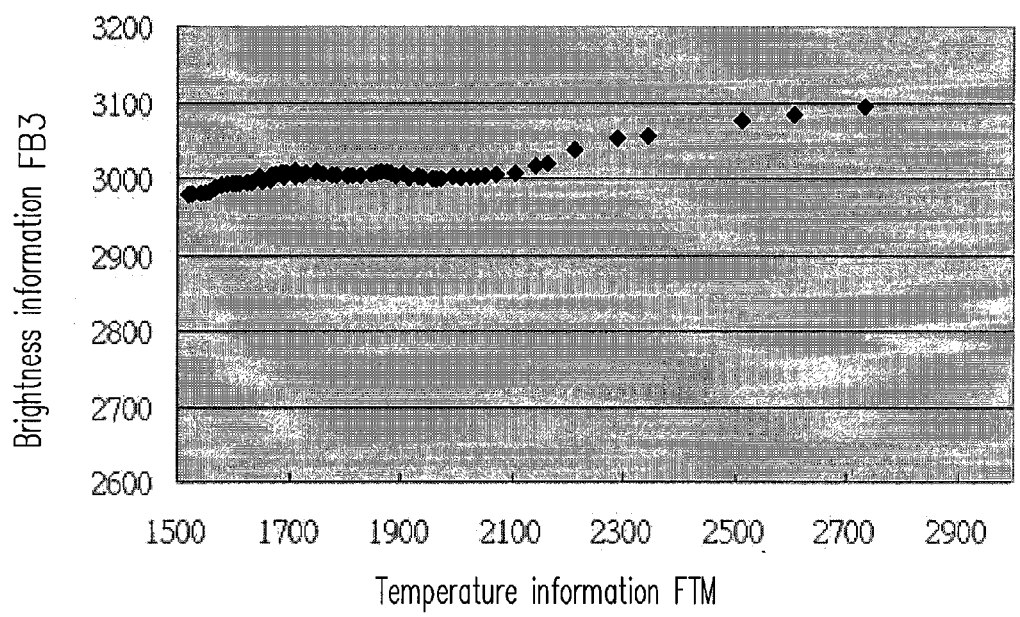

Herein the white balance parameters obtained by the control unit 130 under different temperatures are as shown in FIG. 7A and FIG. 7B. A higher value of the temperature information FTM indicates a lower temperature around the device. Besides, with the driving signal DR2 being kept unchanged, the control unit 130 has to decrease the value of the brightness information FB1 and increases the value of the brightness information FB3 along with the decrease in the temperature. The predetermined brightness information FB1'-FB3' stored in the setting table is as shown in following table 2, wherein the predetermined brightness information FB2' does not change with the temperature therefore is indicated with "*", and the correspondence between the predetermined brightness information FB1' and FB3' and the predetermined temperature information FTM' is deduced from the information illustrated in FIG. 7A and FIG. 7B.

TABLE 2

|  | FB1' | FB2' | FB3' |
|---|---|---|---|
| 30° C. | 1300 | * | 3100 |
| 40° C. | 1340 | * | 3050 |
| 50° C. | 1350 | * | 3000 |
| 60° C. | 1370 | * | 2950 |
| 70° C. | 1400 | * | 2900 |

Figure 8A:
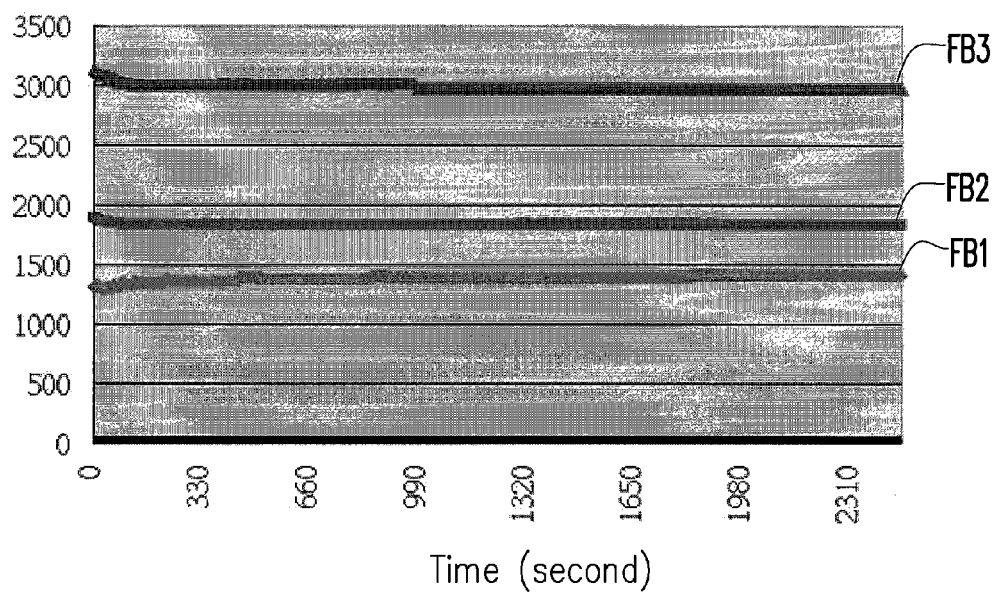
FIGS. 8A-8B are graphs respectively illustrating brightness information and LED currents vs. time according to another embodiment of the present invention.
Figure 8B:
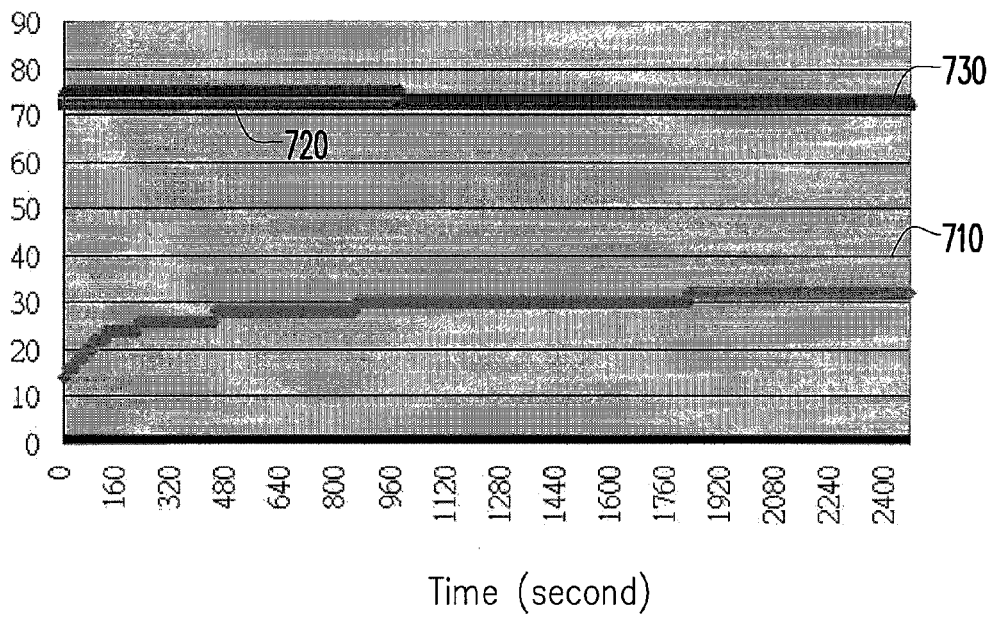

When the projection apparatus 100 is in operation, the microcontroller 132 may also keep the driving signal DR2 unchanged and adjust the amplitudes and/or the duty cycles of the driving signals DR1 and DR3 according to foregoing table 2, so as to keep the light source in the white balance mode. Herein, as shown in FIG. 8A, while adjusting the light source, the brightness information FB2 remains unchanged, and the brightness information FB1 and FB3 approaches the predetermined brightness information FB1' and FB3' stored in the setting table along the elapse of time. FIG. 8B is a timing diagram of the currents flowing through the LEDs in FIG. 8A, wherein the curves 710-730 respectively indicate the currents flowing through the LEDs 141-143. As shown in FIG. 8B, while adjusting the light source, the current flowing through the LED 142 remains unchanged, while the currents flowing through the LEDs 141 and 143 approaches a predetermined value along with the elapse of time.

The light source driver 133 may also calibrate the light source generated by the illumination unit 110 by keeping the driving signal DR3 unchanged while adjusting the driving signals DR1 and DR2. This adjustment method is similar to those described above therefore will not be described herein. It should be mentioned that the light source driver 133 may also adjust the amplitudes and/or the duty cycles of the driving signals DR1-DR3 by keeping the total power of the illumination unit 110 unchanged.

If the total power of the illumination unit 110 is kept unchanged, when the white balance of the projection apparatus 100 is calibrated before the projection apparatus 100 leaves the factory, the control unit 130 adjusts the amplitudes and/or the duty cycles of the driving signals DR1-DR3 according to the external control information FCT, so as to calibrate the light source. Herein the white balance parameters obtained by the control unit 130 under different temperatures are as shown in FIGS. 9A-9C.

Figure 9A:
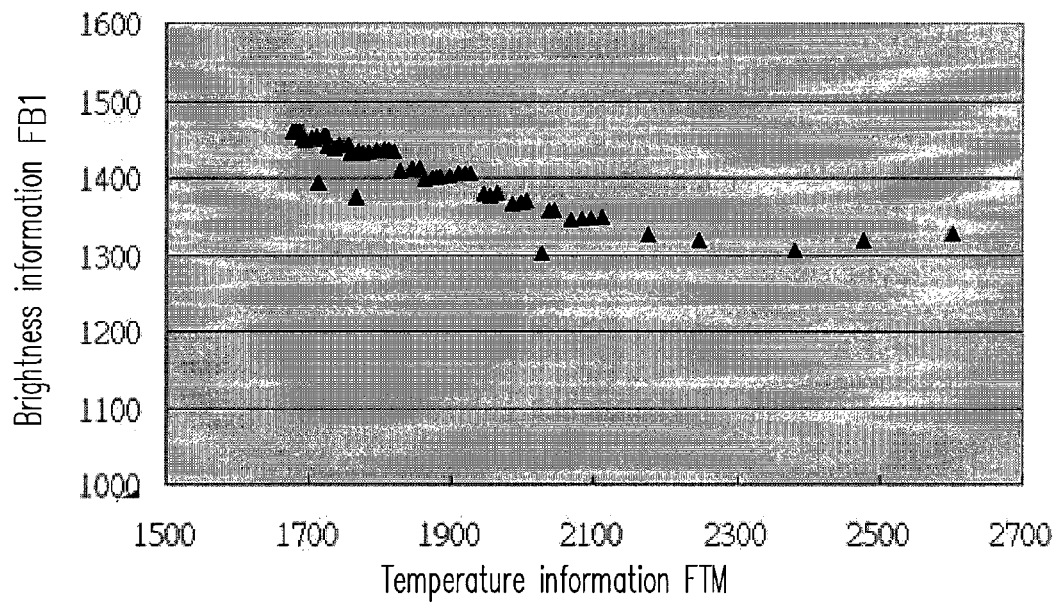
FIGS. 9A-9C are graphs illustrating brightness information vs. temperature information according to yet another embodiment of the present invention.
Figure 9B:
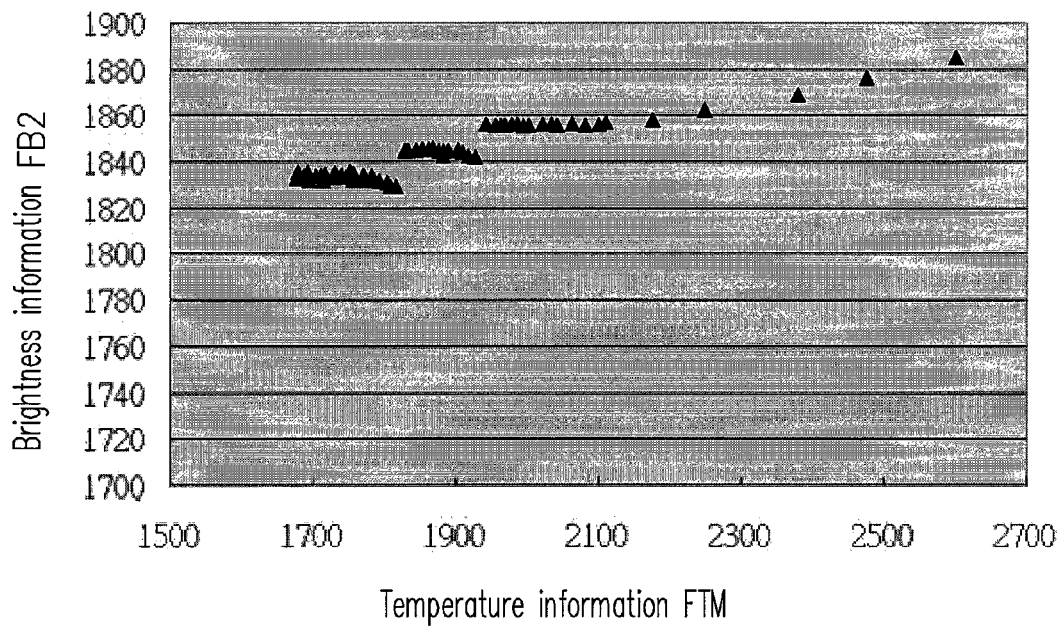
Figure 9C:
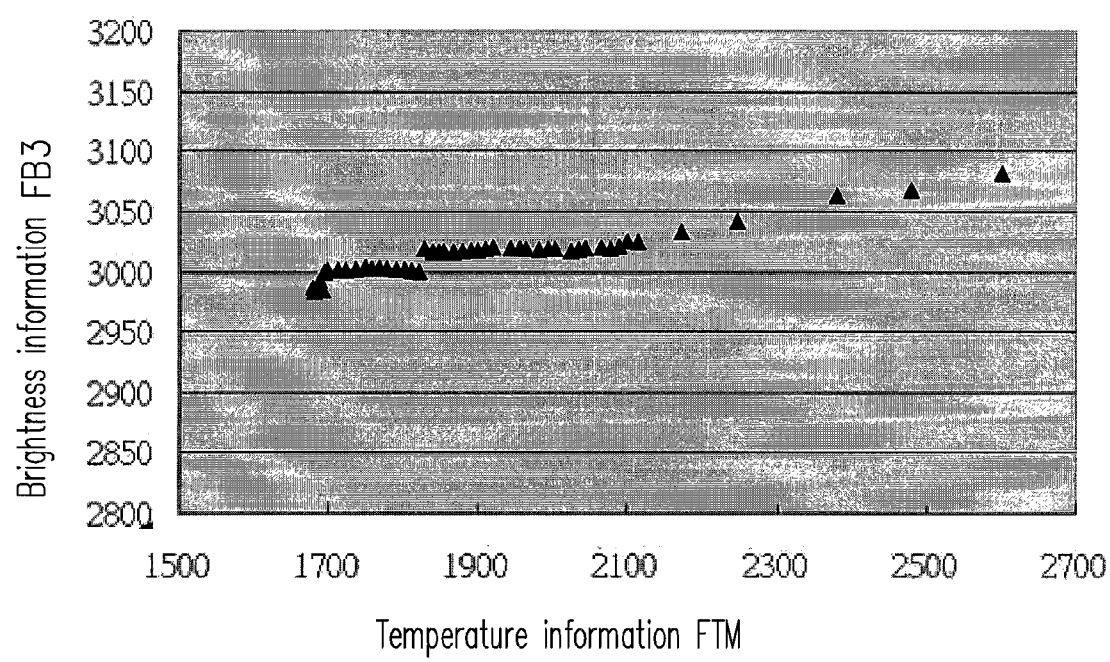

Referring to FIGS. 9A-9C, a higher value of the temperature information FTM indicates a lower temperature around the device. Besides, with the total power of the illumination unit 110 being kept unchanged, the control unit 130 has to decrease the value of the brightness information FB1 and increase the values of the brightness information FB2 and FB3 along with the decrease in the temperature. The brightness information FB1-FB3 stored in the setting table is as shown in following table 3, wherein the correspondence between the predetermined brightness information FB1'-FB3' and the predetermined temperature information FTM' is deduced from the information illustrated in FIGS. 9A-9C.

TABLE 3

|  | FB1' | FB2' | FB3' |
|---|---|---|---|
| 30° C. | 1200 | 1900 | 3090 |
| 40° C. | 1250 | 1900 | 3050 |
| 50° C. | 1300 | 1850 | 3000 |
| 60° C. | 1350 | 1800 | 2900 |
| 70° C. | 1400 | 1800 | 2800 |

Figure 10A:
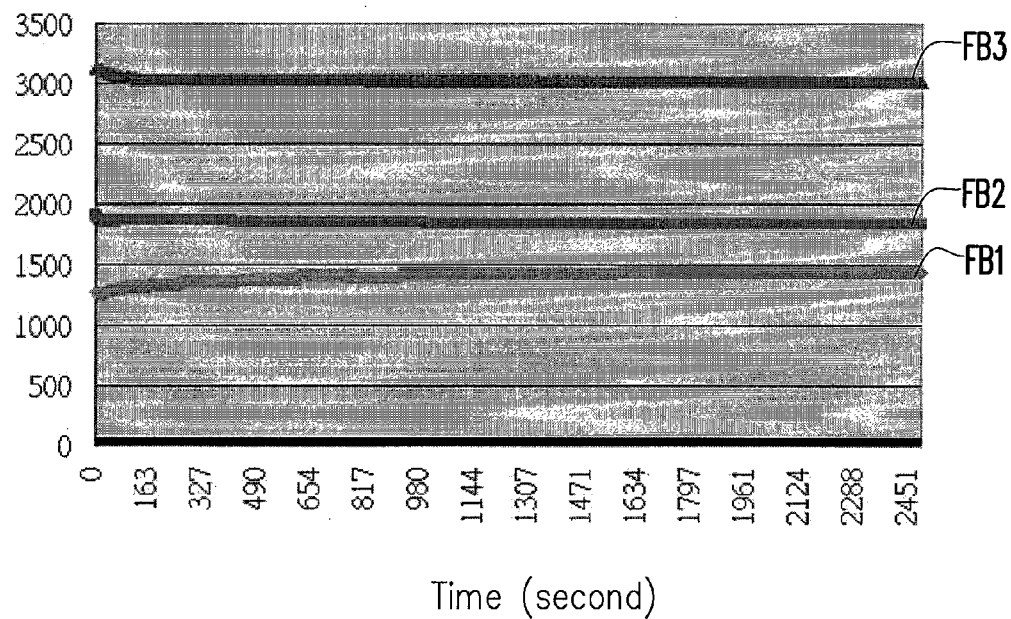
FIGS. 10A-10B are graphs respectively illustrating brightness information and LED currents vs. time according to yet another embodiment of the present invention.
Figure 10B:
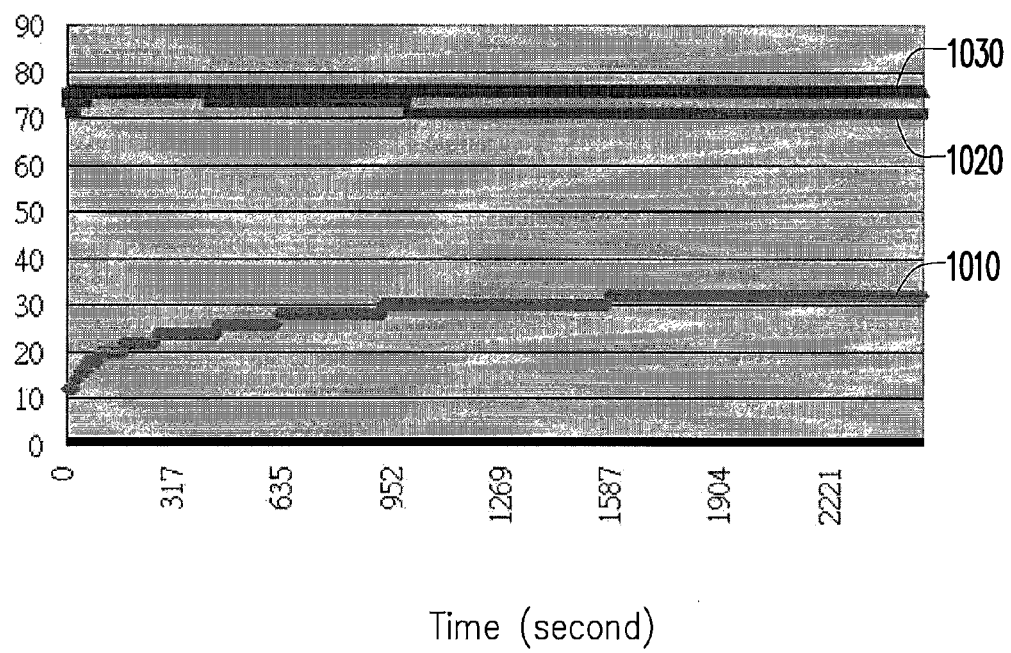

When the projection apparatus 100 is in operation, the microcontroller 132 may also keep the total power of the illumination unit 110 unchanged and adjust the amplitudes and/or the duty cycles of the driving signals DR1-DR3 according to foregoing table 3 to keep the light source in the white balance mode. Herein, as shown in FIG. 10A, while adjusting the light source, the brightness information FB1-FB3 approaches the predetermined brightness information FB1'-FB3' stored in the setting table along with the elapse of time. FIG. 10B is a timing diagram of the currents flowing through the LEDs in FIG. 10A, wherein the curves 1010-1030 respectively indicate the currents flowing through the LEDs 141-143. As shown in FIG. 10B, while adjusting the light source, the currents flowing through the LEDs 141-143 approaches a predetermined value along with the elapse of time.

Figure 11:
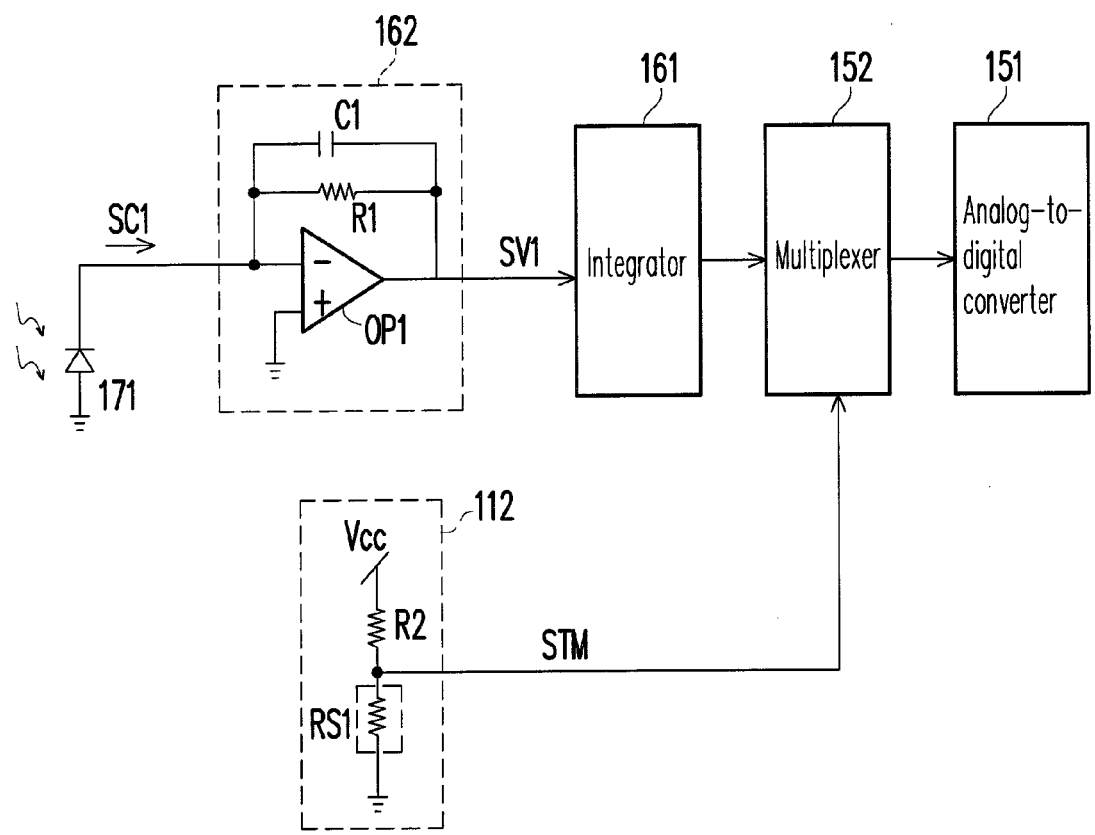
FIG. 11 is a partial circuit diagram of a projection apparatus according to an embodiment of the present invention.

It should be noted that even though the signal conversion circuit 121 and the brightness detection circuit 122 are disposed in the display unit 120 in the embodiment illustrated in FIG. 1, the present invention is not limited thereto. Those having ordinary knowledge in the art should be able to dispose the signal conversion circuit 121 and/or the brightness detection circuit 122 outside the display unit 120 according to the actual design requirement. In addition, in order to allow those having ordinary knowledge in the art to further understand the embodiment in FIG. 1, a projection apparatus will be further described. FIG. 11 is a partial circuit diagram of a projection apparatus according to an embodiment of the present invention.

Referring to FIG. 11, the current-to-voltage converter 162 includes an operational amplifier OP1, a resistor R1, and a capacitor C1. The negative input terminal of the operational amplifier OP1 is electrically connected to the color sensor 171, and the positive input terminal of the operational amplifier OP1 is electrically connected to a ground terminal. The resistor R1 is electrically connected between the negative input terminal and the output terminal of the operational amplifier OP1. The capacitor C1 is connected with the resistor R1 in parallel. The operational amplifier OP1 converts the sensing current SC1 generated by the color sensor 171 into the sensing voltage SV1 through the feedback mechanism produced by the capacitor C1 and the resistor R1.

Referring to FIG. 11 again, the temperature sensor 112 includes a resistor R2 and a thermal-sensitive resistor RS1. The resistor R2 and the thermal-sensitive resistor RS1 are connected in series between a supply voltage $V_{CC}$ and the ground terminal. The resistance of the thermal-sensitive resistor RS1 changes with the temperature of the thermal-sensitive resistor RS1 in operation. Thus, the voltage difference on the thermal-sensitive resistor RS1 also changes with the temperature. In other words, the temperature sensor 112 generates the temperature-related temperature sensing signal STM according to the voltage difference on the thermal-sensitive resistor RS1.

In summary, in the present invention, a setting table is established before a projection apparatus leaves the factory, and when the projection apparatus is in operation, a control unit thereof calibrates the light source according to white balance parameters recorded in the setting table. In addition, in the present invention, the driving signals can be adjusted through different techniques, and brightness information related to the light source can be obtained through either long-term integration or short-term integration. Thereby, the calibration accuracy of the light source is improved, and accordingly the image display quality of the projection apparatus is improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A projection apparatus, comprising:
   an illumination unit, for generating a light source according to a plurality of driving signals and providing a temperature sensing signal according to a temperature of the light source, wherein the illumination unit comprises:
   a light emitting diode array, for providing a first color light, a second color light, and a third color light to compose the light source; and
   a temperature sensor, for sensing temperatures of the first color light, the second color light, and the third color light to generate the temperature sensing signal;
   a brightness detection circuit, for detecting a brightness of the light source and generating a plurality of brightness sensing signals, wherein the brightness detection circuit comprises
   a plurality of color sensors, wherein in a first integration mode, the color sensors are simultaneously turned on to detect the first color light, the second color light, and the third color light according to a sequence in which the first color light, the second color light, and the third color light are generated, and in a second integration mode, the color sensors are sequentially turned on for a predetermined time to respectively detect the first color light, the second color light, and the third color light, and the color sensors generate a plurality of sensing currents according to a detection result;
   a current-to-voltage converter, for converting the sensing currents into a plurality of sensing voltages; and
   an integrator, for integrating the sensing voltages in accordance with the first integration mode or the second integration mode to generate the brightness sensing signals;
   a signal conversion circuit, for converting the temperature sensing signal and the brightness sensing signals into temperature information and a plurality of brightness information; and
   a control unit, comprising a setting table for storing a predetermined temperature information and a plurality of predetermined brightness information, wherein the control unit adjusts the driving signals in order to identify the converted temperature information and the converted brightness information conform to the stored information in the setting table.

2. The projection apparatus according to claim 1, wherein the predetermined temperature information and the predetermined brightness information represents different white balance settings of the illumination unit.

3. The projection apparatus according to claim 1, wherein the control unit comprises:
   a light source driver, for adjusting the driving signals according to driving information to adjust the light source into a white balance mode; and
   a microcontroller, wherein in a calibration mode, the microcontroller generates the driving information according to an external control information and records the temperature information and the plurality of brightness information conforming to the white balance mode into the setting table so as to set up the predetermined temperature information and the plurality of predetermined brightness information, and in a feedback control mode, the microcontroller looks up the setting table according to the temperature information and generates the driving information according to a search result.

4. The projection apparatus according to claim 3, wherein the light source driver keeps one of the driving signals unchanged and adjusts amplitudes and/or duty cycles of the rest driving signals.

5. The projection apparatus according to claim 3, wherein the light source driver keeps a total power of the illumination unit unchanged and adjusts amplitudes and/or duty cycles of the driving signals.

6. The projection apparatus according to claim 1, wherein the current-to-voltage converter comprises:
- an operational amplifier, having a negative input terminal electrically connected to one of the color sensors, a positive input terminal electrically connected to a ground terminal, and an output terminal for outputting one of the sensing voltages;
- a resistor, electrically connected between the negative input terminal and the output terminal of the operational amplifier; and
- a capacitor, connected with the resistor in parallel.

7. The projection apparatus according to claim 1, wherein the signal conversion circuit comprises:
- a multiplexer, for receiving the temperature sensing signal and the brightness sensing signals and sequentially outputting the temperature sensing signal and the brightness sensing signals; and
- an analog-to-digital converter, for sequentially converting the temperature sensing signal and the brightness sensing signals output by the multiplexer into digital information to generate the temperature information and the plurality of brightness information.

8. The projection apparatus according to claim 1 further comprising:
- a timing controller, disposed in the control unit, for generating an image data; and
- a display unit, for generating an image according to the image data under irradiation of the light source.

9. The projection apparatus according to claim 8, wherein the brightness detection circuit and the signal conversion circuit are disposed in the display unit.

\* \* \* \* \*